United States Patent [19]

Seragnoli

[11] 4,442,848

[45] Apr. 17, 1984

[54] CIGARETTE-MAKING MACHINE

[75] Inventor: Enzo Seragnoli, Bologna, Italy

[73] Assignee: G.D. Societa' per Azioni, Bologna, Italy

[21] Appl. No.: 345,038

[22] Filed: Feb. 2, 1982

[30] Foreign Application Priority Data

Feb. 23, 1981 [IT] Italy ................. 47873 A/81

[51] Int. Cl.³ .............................................. A24C 5/39
[52] U.S. Cl. ................................................... 131/108
[58] Field of Search ............... 131/108, 109 R, 109 B, 131/109 AB, 84 R, 909

[56] References Cited

U.S. PATENT DOCUMENTS 2,570,270 10/1951 Patterson ............................ 131/108

4,373,538 2/1983 Steiniger ......................... 131/109 B

Primary Examiner—Vincent Millin
Assistant Examiner—Harry J. Macey
Attorney, Agent, or Firm—Merriam, Marshall & Bicknell

[57] ABSTRACT

A cigarette-making machine in which tobacco, in part from a carding unit and in part from a plurality of channel elements, is supplied to the upper end of a shaft. The channel elements, to which recycled tobacco can be supplied, are located alongside one another and communicate laterally with the shaft below the shaft top. A vibrator device is associated with each channel element. The frequency of vibration of each vibrator is a function of the level of tobacco within the shaft beneath the tobacco delivery end of each channel element in communication with the shaft.

5 Claims, 2 Drawing Figures

CIGARETTE-MAKING MACHINE

BACKGROUND OF THE INVENTION

The present invention relates to a cigarette-making machine.

In particular, the present invention relates to a cigarette-making machine having an input chamber from which the shredded tobacco is taken by a carding unit to be supplied to a descending shaft. At the lower end of this latter there is located a supply conveyor which conveys the tobacco towards the lower end of an ascending output shaft.

In general, the said descending shaft serves as an accumulation magazine in that, within it, there is constantly present a column of tobacco from the lower end of which the tobacco itself is continuously taken by a toothed roller which feeds it over the said conveyor.

In the known cigarette-making machine as described above, the upper surface of the said tobacco column is not normally a flat surface because of the fact that the said carding unit supplies the tobacco to the interior of the descending shaft in an imperfectly uniform manner over the whole of the width of the descending shaft itself.

Such non-uniformity involves significant disadvantages in that they cause non-uniformities in the carpet of tabacco formed by the said toothed roller on the said conveyor and, therefore, non uniformity in the distribution of tobacco along the continuous rod of cigarette which is formed at the output of the said rising shaft.

For the purpose of eliminating such disadvantages it is known to provide within the descending shaft a plurality of level indicators distributed over the width of the shaft itself and operable to detect the level reached by the tobacco at several points across the top of the said column. The signals emitted by these level indicators are used to correct the distribution of the tobacco taken from the carding unit. In particular, one known method of correction consists in taking off, by means of rotary take-off elements, quantities of tobacco determined across the width of the carding unit in such a way that these latter supply less tobacco to the zones of the descending shaft in which the level of the tobacco is greater. Another method of correction lies in achieving a similar result by separating the carding unit into a plurality of sub-units disposed alongside one another across the width of the descending shaft, and in selectively adjusting their speed of supply in response to the signals received by the said level indicators.

From what has been described above it is clear that the known methods of correction described require, for their performance, extremely complicated mechanical devices which, as well as rendering the cigarette-making machine extremely expensive, drastically reduce the reliability thereof.

SUMMARY OF THE INVENTION

The object of the present invention is that of providing a cigarette-making machine in which the distribution of tobacco in the column which is formed within the said descending shaft is controlled and corrected in a simple and economic manner. The said object is achieved by the present invention in that it relates to a cigarette-making machine including a descending shaft, a main tobacco supply unit communicating with an upper, input end of the said shaft, and a toothed take-off element located beneath a lower, output end of the said shaft, characterized by the fact that it further includes an auxiliary supply unit communicating with the said shaft and comprising at least two tobacco introduction elements disposed along side one another along a major transverse direction of the said shaft and independent from one another; and a detection system sensitive to the level reached by the tobacco within the said shaft beneath each of the said introduction elements for selectively controlling the rate of flow along these.

BRIEF DESCRIPTION OF THE DRAWINGS

Further characteristics and advantages of the present invention will become apparent from the following description with reference to the attached drawings, which illustrate a non limitative embodiment thereof, in which.

DETAILED DESCRIPTION OF THE INVENTION

Figure 1:
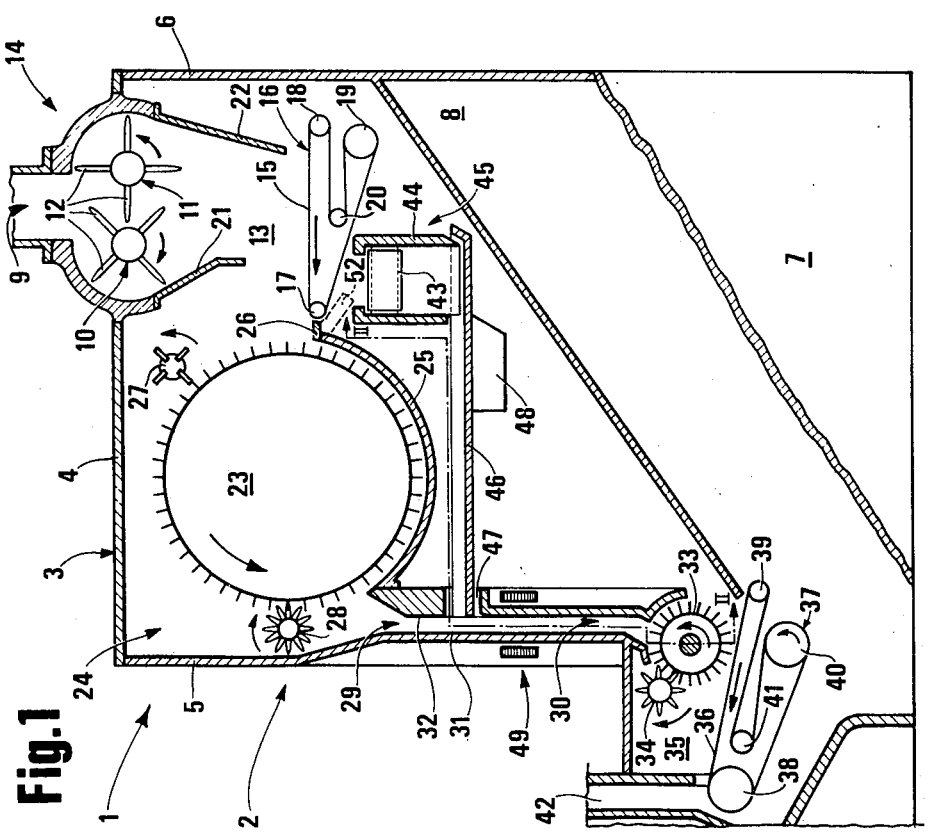
FIG. 1 is a section taken on a vertical plane schematically illustrating a part of a cigarette-making machine formed according to the principles of the present invention.

FIG. 1 illustrates a cigarette-making machine 1 comprising a distributor 2 which serves the purpose of forming a continuous and uniform flow of tobacco particles from a mass of shredded tobacco.

The members comprising the distributor 2 are contained in an upwardly extending casing 3 closed at the top by a horizontal wall 4 and at the sides by two vertical walls 5 and 6. On two sides parallel to the plane of FIG. 1 the casing 3 is closed by a front wall 7 and by a rear or back wall 8. The upper wall 4 has a passage opening for an input shaft 9 having a rectangular section, beneath which there are disposed, within the casing 3, two rotatable driven rollers 10 and 11 provided around their surfaces with radial teeth 12.

The rollers 10 and 11, by rotating respectively in opposite directions with respect to one another effect a preliminary carding operation on the tobacco, conveying it towards an underlying chamber 13. The shaft 9 and the rollers 10 and 11 together define a pre-supply unit 14 and overlie the chamber 13 the bottom of which is defined by a conveyor mat 15 constituted by the upper branch of a belt 16 wound in a loop about three deflector rollers, 17, 18 and 19, at least one of which is driven, and a tensioner roller 20.

Two inclined and converging walls 21 and 22, both extending downwardly from the wall 4 convey the tobacco descending from the pre-supply unit 14 onto the mat 15.

On the site opposite the wall 22 the chamber 13 is delimited by a toothed carding roller 23 forming part of a carding unit or main supply 24 close to the downstream end of the mat 15.

Beneath the roller 23 there is provided a cylindrical cowling 25 coaxial thereto, which supports at one end a scraper 26 extending between the roller 23 and the downstream end of the mat 15. For addition to the roller 23, the unit 24 includes a roller 27, the said metering roller, which turns in the same direction as the roller 23 and is disposed in a position overlying and substantially tangential with respect to this latter.

As a consequence of this arrangement the tobacco flowing out from the overlying pre-supply unit 14 onto the mat 25 is pushed by this across the scraper element 26 onto the carding roller 23. The carding roller 23 transfers the layer of tobacco out from the chamber 13 and downstream from its tangential position with respect to the metering roller 27, the thickness of the layer of tobacco being substantially equal to the radial dimensions of its teeth.

A toothed roller 28, called a thrower roller, takes the layer of tobacco from the roller 23 projecting it, in the form of separate particles, into the interior of an input hopper 29 of a substantially vertical shaft 30 delimited by two walls 31 and 32. The lower end of the shaft 30 faces the periphery of a toothed element constituted by a toothed roller 33 which acts to transfer the tobacco out from the shaft 30 itself.

A toothed roller 34, called a thrower roller, takes the tobacco from the teeth of the roller 33 projecting it, in the form of separate particles, into a chamber 35 the bottom wall of which is defined by a mat 36, called a collector mat, movable, as viewed in FIG. 1, from right to left, and inclined upwardly in the direction of movement.

The mat 36 is constituted by the upper branch of a belt 37 wound on three deflector rollers 38, 39 and 40, of which at least one is driven and maintained under tension by a tensioner roller 41. The roller 38 is disposed adjacent the lower end of a rising shaft 42 the upper end (not illustrated) of which communicates with a rod-forming unit (not illustrated). As is known, in the said rod-forming unit the particles of tobacco which adhere to the lower face of at least one suction conveyor belt (not illustrated) form on it a layer (not illustrated) which is rendered of uniform thickness by the operation of a shaving device (not illustrated).

Figure 2:
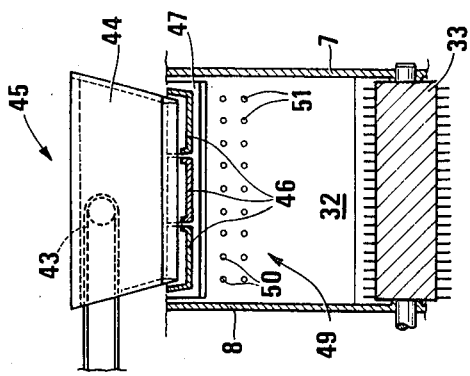
FIG. 2 is a section taken on the line II—II of FIG. 1.

The tobacco carried away from the said shaving device is supplied, by means of a conveyor, not illustrated, onto a belt conveyor 43 disposed immediately beneath the chamber 13 and terminating in a substantially vertical hopper 44 (see also FIG. 2).

The belt conveyor 43 and the hopper 44 constitute the input of an auxiliary supply unit 45 further including a plurality of channel induction elements 46 communicating with the hopper 44 and disposed adjacent one another and lying in an upwardly concave orientation.

The elements 46 have a slight downward inclination and open into the interior of the shaft 30 through a slit 47 formed through the wall 32. In particular, as illustrated in FIG. 2, the adjacent ends of the elements 46 occupy the whole of the slot 47, which, in turn extends over the whole width of the shaft 30.

Each of the elements 46 has associated therewith respective actuator means, constituted by a vibrator device 48 the frequency of vibration of which is variable and is controlled by a detector system 49 of the optical type comprising detector means constituted by two sets of photodiodes 50 and 51 defining a maximum level and a minimum level respectively for the tobacco within the shaft 30. In use, the tobacco coming from the auxiliary supply unit 45 falls into the shaft 30 and collects there directly beneath the individual channel element 46 in such a way as to continuously fill any possible depressions which form on the top of the column of tobacco present in the interior of the shaft 30 beneath the slot 47.

In this way the said column is maintained at a constantly uniform height over the whole width of the shaft 30 and permits the formation of a substantially uniform layer of tobacco on the mat 36.

Further to what has been explained above it is suitable to observe that the tobacco coming from the said shaver device (not illustrated), being particularly fine, can advantageously be employed given the total absence of lumps, to compensate perfectly any small depression present on the top of the column of tobacco within the interior of the shaft 30.

Obviously fine tobacco can be taken for the same purpose, together with or alternatively to the said tobacco from the shaver, from other points of the machine 1. In particular, in the variant illustrated with broken outline in FIG. 1, fine tobacco is supplied to the hopper 44 by means of a duct 52 the upper end of which communicates with the chamber 13 through a seive (not illustrated) disposed at the location of the scraper element 26.

I claim:

1. A cigarette making machine comprising a main tobacco supply unit (24), a shaft (30) extending downwards from a bottom portion of said main tobacco supply unit (24), and an auxiliary supply unit (45) communicating with an intermediate portion of said shaft (30), said auxiliary supply unit (45) comprising at least two tobacco conveying means (46) independent of one another and extending alongside one another in a major transverse direction of said shaft (30), and tobacco-flow control means (49) associated with each said conveying means (46) and sensitive to the level of tobacco within said shaft (30).

2. A machine as claimed in claim 1, wherein each said conveying means comprises a tobacco feeding channel (46), and actuator means (48) associated with said channel (46) and adapted to vary the tobacco flow there along in reply to signals from a respective said tobacco-flow control means (49).

3. A machine as claimed in claim 2, wherein said actuator means comprises a variable frequency vibrator.

4. A machine as claimed in claim 1, wherein each said tobacco-flow control means (49) comprises a plurality of detection elements (50) arranged on a portion of said shaft (30) extending downward from said intermediate portion.

5. A machine as claimed in claim 4, wherein each said plurality of detection elements (50) is arranged directly below an output end of the respective tobacco conveying means (46).

* * * * *